(12) United States Patent
Rüschoff et al.

(10) Patent No.: US 9,309,868 B2
(45) Date of Patent: Apr. 12, 2016

(54) WIND TURBINE POWER TRANSMISSION SYSTEM AND METHOD OF INSTALLING A WIND FARM INCLUDING SAME

(75) Inventors: Ralf Rüschoff, Datteln (DE); Peter Mongeau, Center Conway, NH (US)

(73) Assignee: Vestas Wind Systems A/S, Aarhus N. (DK)

( * ) Notice: Subject to any disclaimer, the term of this patent is extended or adjusted under 35 U.S.C. 154(b) by 130 days.

(21) Appl. No.: 13/879,972

(22) PCT Filed: Oct. 17, 2011

(86) PCT No.: PCT/DK2011/050390
§ 371 (c)(1),
(2), (4) Date: Jul. 29, 2013

(87) PCT Pub. No.: WO2012/052024
PCT Pub. Date: Apr. 26, 2012

(65) Prior Publication Data
US 2013/0300125 A1    Nov. 14, 2013

Related U.S. Application Data

(60) Provisional application No. 61/393,995, filed on Oct. 18, 2010, provisional application No. 61/450,151, filed on Mar. 8, 2011.

(51) Int. Cl.
*F03D 9/00*  (2006.01)
*F03D 1/00*  (2006.01)
(Continued)

(52) U.S. Cl.
CPC ............... *F03D 9/002* (2013.01); *F03D 1/001* (2013.01); *F03D 11/02* (2013.01); *H02K 7/1838* (2013.01);
(Continued)

(58) Field of Classification Search
CPC ......... F03D 1/001; F03D 9/002; F03D 11/02; H02K 7/1838; Y02E 10/722; Y02E 10/725
USPC .............................................. 290/1 C, 44, 55
See application file for complete search history.

(56) References Cited

U.S. PATENT DOCUMENTS 4,239,977 A * 12/1980 Strutman ........................ 290/44
4,527,072 A *  7/1985 van Degeer ..................... 290/55
(Continued)

FOREIGN PATENT DOCUMENTS

DE           10334448 A1    2/2005
DE         102008044900 A1   3/2010
(Continued)

OTHER PUBLICATIONS

European Patent Office, International Search Report issued in corresponding International Application No. PCT/DK2011/050390 dated Feb. 22, 2012, 3 pages.

*Primary Examiner* — Tulsidas C Patel
*Assistant Examiner* — Viet Nguyen
(74) *Attorney, Agent, or Firm* — Wood, Herron & Evans, LLP (57) ABSTRACT

A power transmission system for a wind turbine comprises a gearbox and generator. The gearbox includes a gear-box housing and gearbox output member. The generator includes: a generator housing having a drive-end side and non-drive-end side, the drive-end side being coupled to the gearbox housing; a stator supported by the generator housing; a rotor coupled to the gearbox output member so as to be driven thereby; a non-drive-end shield coupled to the non-drive-end side of the generator housing; and at least one auxiliary drive mounted to the non-drive-end shield. The at least one auxiliary drive is configured to rotate the turning gear. A corresponding method of installing a wind farm including such a power transmission system is also provided.

12 Claims, 6 Drawing Sheets

(51) Int. Cl.
  *F03D 11/02* (2006.01)
  *H02K 7/18* (2006.01)
  *F16H 1/46* (2006.01)
(52) U.S. Cl.
  CPC ............... *F16H 1/46* (2013.01); *Y02E 10/722* (2013.01); *Y02E 10/725* (2013.01); *Y02E 10/728* (2013.01); *Y10T 29/49009* (2015.01)

(56) References Cited

U.S. PATENT DOCUMENTS

| | | | | |
|---|---|---|---|---|
| 4,662,233 | A | * | 5/1987 | Mazzorana ..................... 74/7 A |
| 5,140,856 | A | * | 8/1992 | Larsen ............................ 73/455 |
| 8,907,517 | B2 | * | 12/2014 | Mongeau et al. ............... 290/55 |
| 2005/0104469 | A1 | * | 5/2005 | Zepp ........................ H02K 7/12 310/191 |
| 2008/0181761 | A1 | * | 7/2008 | Moore .................. F03D 7/0248 415/1 |
| 2008/0199309 | A1 | * | 8/2008 | Bagepalli et al. ........... 415/170.1 |
| 2009/0278359 | A1 | * | 11/2009 | Trede ............................. 290/55 |
| 2010/0133854 | A1 | * | 6/2010 | Jansen et al. ................... 290/1 C |
| 2010/0314873 | A1 | * | 12/2010 | Stone ............................. 290/44 |
| 2011/0142617 | A1 | * | 6/2011 | Mashue ................ F03D 7/0224 415/229 |
| 2011/0142649 | A1 | * | 6/2011 | Ramanujam ............ F03D 9/002 416/170 R |
| 2011/0185832 | A1 | * | 8/2011 | Dammer et al. ................. 74/325 |
| 2012/0133155 | A1 | * | 5/2012 | Sorg ................................ 290/1 C |
| 2013/0302144 | A1 | * | 11/2013 | Demtroder et al. ......... 415/124.2 |

FOREIGN PATENT DOCUMENTS

| | | |
|---|---|---|
| EP | 1167754 A2 | 1/2002 |
| EP | 1659286 A1 | 5/2006 |

* cited by examiner

WIND TURBINE POWER TRANSMISSION SYSTEM AND METHOD OF INSTALLING A WIND FARM INCLUDING SAME

CROSS-REFERENCE

This application claims the benefit of U.S. Provisional Patent Application No. 61/393,995, filed on Oct. 18, 2010 and entitled "DRIVETRAIN FOR A WIND TURBINE". This application also claims the benefit of U.S. Provisional Patent Application No. 61/450,151, filed Mar. 8, 2011 and entitled "WIND TURBINE POWER TRANSMISSION SYSTEM".

TECHNICAL FIELD

The present invention relates to power transmission systems. More specifically, the present invention relates to wind turbine power transmission systems having an integrated gearbox and generator and a method of installing a wind farm including such power transmission systems.

BACKGROUND

Wind turbines typically include a rotor with large blades driven by the wind. The rotor blades convert the kinetic energy of the wind into rotational mechanical energy. The mechanical energy usually drives one or more generators to produce electrical power. Thus, wind turbines include a power transmission system to process and convert the rotational mechanical energy into electrical energy. The power transmission system is sometimes referred to as the "power train" of the wind turbine. The portion of a power transmission system from the wind turbine rotor to the generator is referred to as the drive train.

Oftentimes it is necessary to increase the rotational speed of the wind turbine rotor to the speed required by the generator(s). This is accomplished by a gearbox between the wind turbine rotor and generator. Thus, the gearbox forms part of the drive train and converts a low-speed, high-torque input from the wind turbine rotor into a lower-torque, higher-speed output for the generator. Although gearboxes are used in many industries, there are particular challenges in designing them for wind turbines due to the magnitude, variety, and unpredictability of forces experienced by the wind turbine rotor and drive train. These forces have the potential to damage bearings and other gearbox components. As a result, gearbox reliability has traditionally been a concern in the wind power industry.

Some manufacturers address this concern by designing power transmission systems without a gear stage. The wind turbine rotor directly drives a low-speed generator in such systems. Although there may be no concerns about gearbox reliability, the lack of a gear stage often gives rise to other concerns. In particular, the low-speed generators in direct-drive wind turbines are typically larger than their high and medium-speed counterparts in geared solutions to produce equivalent amounts of power. The larger size presents transportation, assembly, and maintenance challenges in addition to cost concerns. Moreover, many of the low-speed generators rely upon permanent magnets incorporating rare earth materials of limited availability.

The competing concerns between traditional drive trains and direct-drive machines has led to increased interest in medium-speed solutions. These "hybrid" solutions typically include an integrated gearbox and medium-speed generator. One such solution is the subject of EP 0 811 764 B1, which discloses a medium-speed, permanent magnet generator mounted to a single stage gearbox. The design was originally conceived by Aerodyn GmbH and has been further developed by Areva. Sometimes referred to as the "multibrid" solution, the design results in a lightweight, compact power transmission system with fewer rotating parts than most traditional drive trains.

Despite the interest in medium-speed solutions, there remains room for improvement. The highly-integrated nature of the designs makes it difficult to accommodate ancillary features like a turning gear, which is sometimes used to slowly rotate the driven components of the power transmission system during low wind speeds. Moreover, even if it is possible to incorporate a turning gear, its use may be limited. For example, significantly more torque is required to rotate the power transmission system if the turning gear is also to be used during a blade installation procedure where the hub is mounted first. At some point during such a procedure there is less than a complete set of the blades mounted to the hub, resulting in an unbalanced load about the rotational axis. Producing enough torque to rotate the unbalanced load is particularly challenging in a medium-speed power transmission system because of the smaller gear ratio in the drive train (compared to high-speed solutions). As a result, it may not be possible to incorporate a large enough motor for driving the turning gear. This limits installation options because it may be necessary to mount the blades to the hub (thereby assembling the complete wind turbine rotor) before mounting the hub to the power transmission system.

SUMMARY

A power transmission system for a wind turbine is disclosed below. The power transmission system comprises a gearbox and generator. The gearbox includes a gearbox housing and gearbox output member. The generator includes: a generator housing having a drive-end side and non-drive-end side, the drive-end side being coupled to the gearbox housing; a stator supported by the generator housing between the drive-end side and non-drive-end side; a rotor coupled to the gearbox output member so as to be driven thereby; and a non-drive-end shield coupled to the non-drive-end side of the generator housing. A turning gear is positioned outside the generator housing, but is coupled to the rotor. At least one auxiliary drive is mounted to the non-drive-end shield and configured to rotate the turning gear.

By providing such an arrangement, the power transmission is able to maintain a compact design. The non-drive-end shield of the generator provides a large enough area to safely accommodate the size and/or number of auxiliary drives required to rotate the power transmission system when less than a complete set of blades are installed on the wind turbine. These objectives may even be achieved while accommodating a mechanical brake on the non-drive-end shield as well. In such an embodiment the power transmission system may further comprise an end adaptor coupled to the rotor and extending out of the generator housing, a brake disc coupled to the end adaptor, and at least one brake caliper fixed relative to the brake disc and configured to apply friction thereto. The turning gear is coupled to the rotor via the end adaptor.

A corresponding method involving such a power transmission system is also disclosed. According to the method, installing a wind farm comprises installing a tower of a first wind turbine and installing the power transmission system on the tower. The at least one auxiliary drive is mounted to the non-drive-end shield before or after the power transmission system is installed. The method further comprises mounting a hub to the power transmission system and mounting one or more blades to the hub. Finally, the turning gear is rotated with the at least one auxiliary drive to rotate the hub.

In a further aspect or embodiment, less than a complete set of blades are mounted to the hub so as to create an unbalanced load on the hub. A plurality of the auxiliary drives are provided and operated to rotate the turning gear. The method may then further involve mounting a complete set of blades on the hub and removing at least some of the auxiliary drives from the non-drive-end shield. Thereafter, the turning gear is rotated with the one or more auxiliary drives remaining on the non-drive-end shield. In an even further aspect, one or more of the auxiliary drives removed from the non-drive-end shield of the first wind turbine may be used to complete the installation of a second wind turbine.

DETAILED DESCRIPTION

Figure 1:
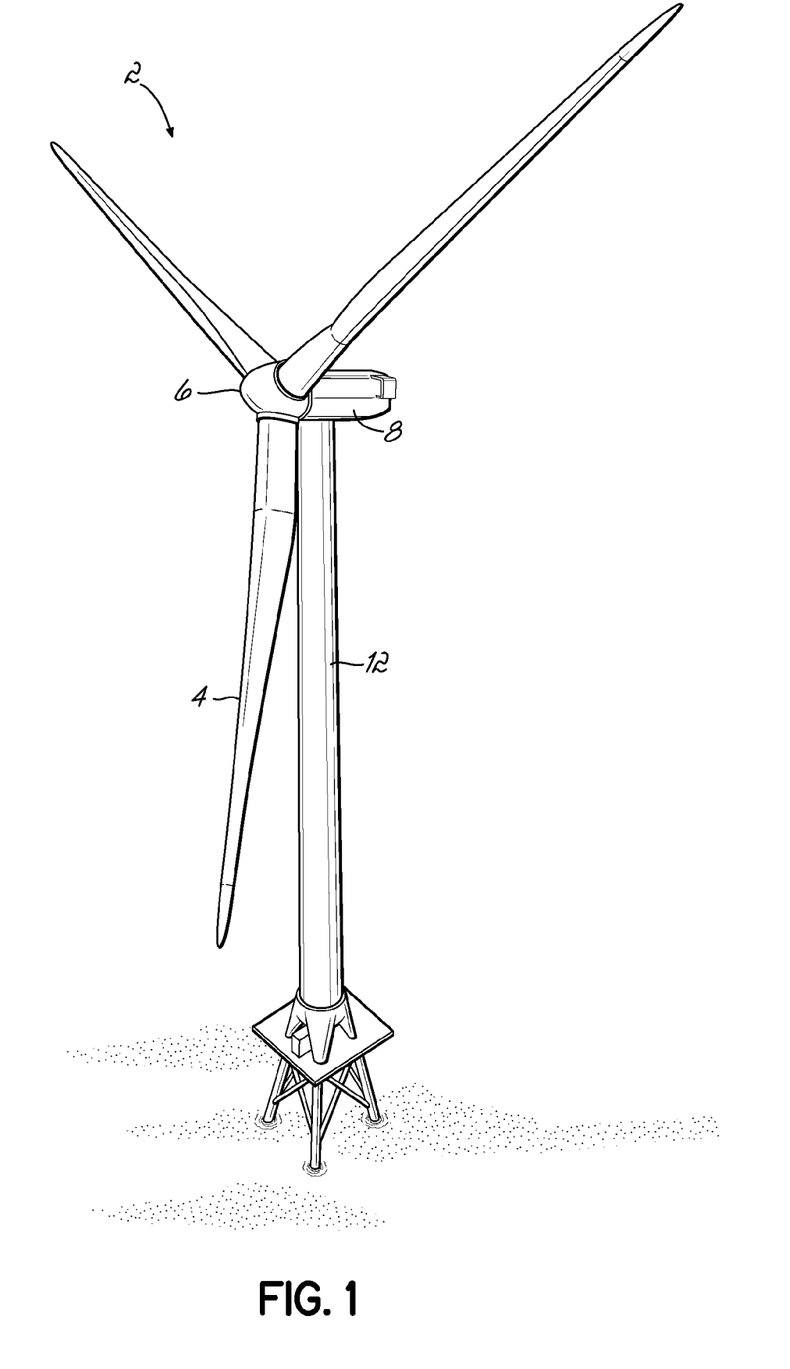
FIG. 1 is a perspective view of one example of a wind turbine.
Figure 2:
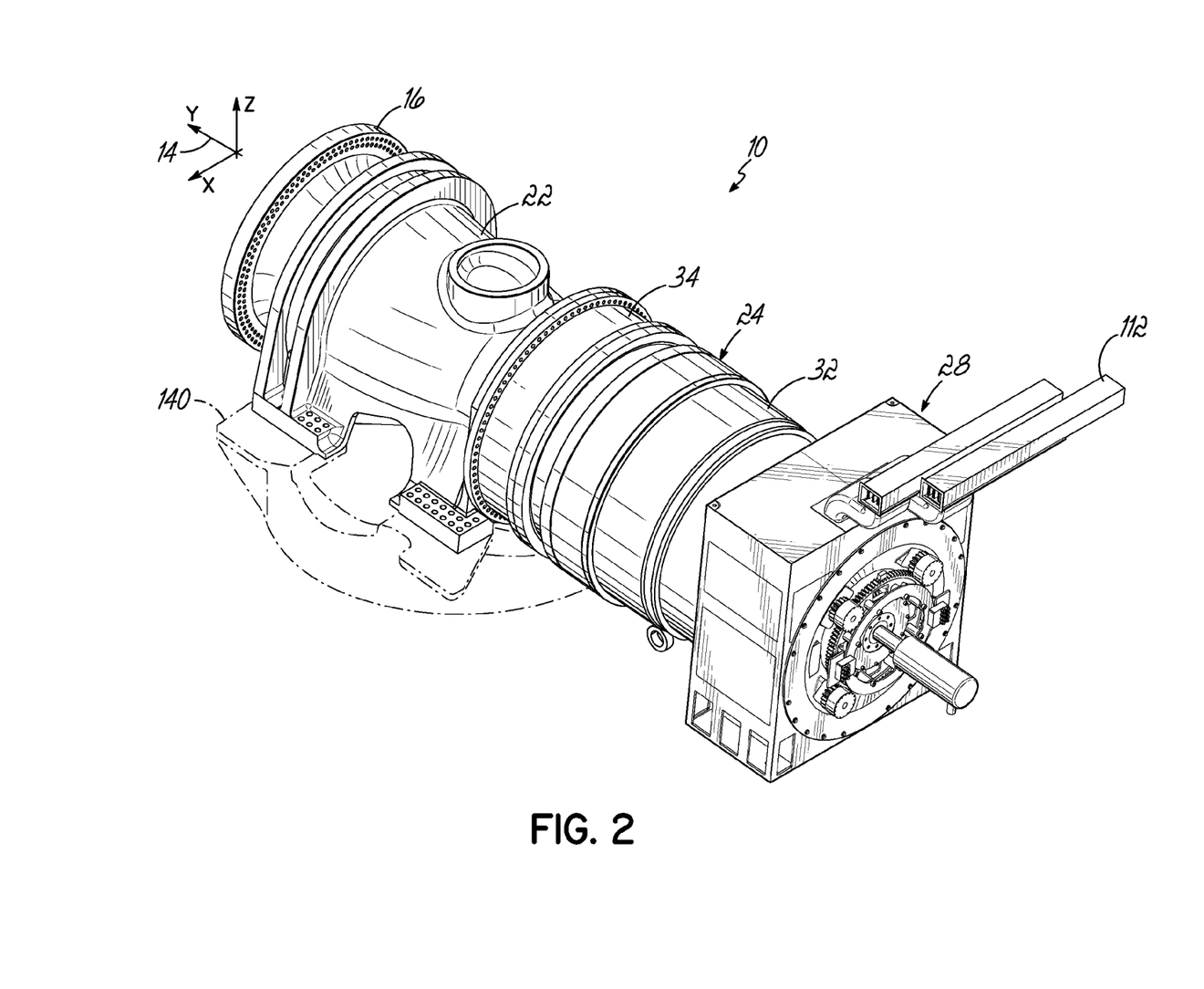
FIG. 2 is a perspective view of a power transmission system for the wind turbine of FIG. 1.

FIG. 1 shows one example of a wind turbine 2. Although an offshore wind turbine is shown, it should be noted that the description below may be applicable to other types of wind turbines. The wind turbine 2 includes rotor blades 4 mounted to a hub 6, which is supported by a nacelle 8 on a tower 12. Wind causes the rotor blades 4 and hub 6 to rotate about a main axis 14 (FIG. 2). This rotational energy is delivered to a power transmission system (or "power train") 10 housed within the nacelle 8.

Figure 3:
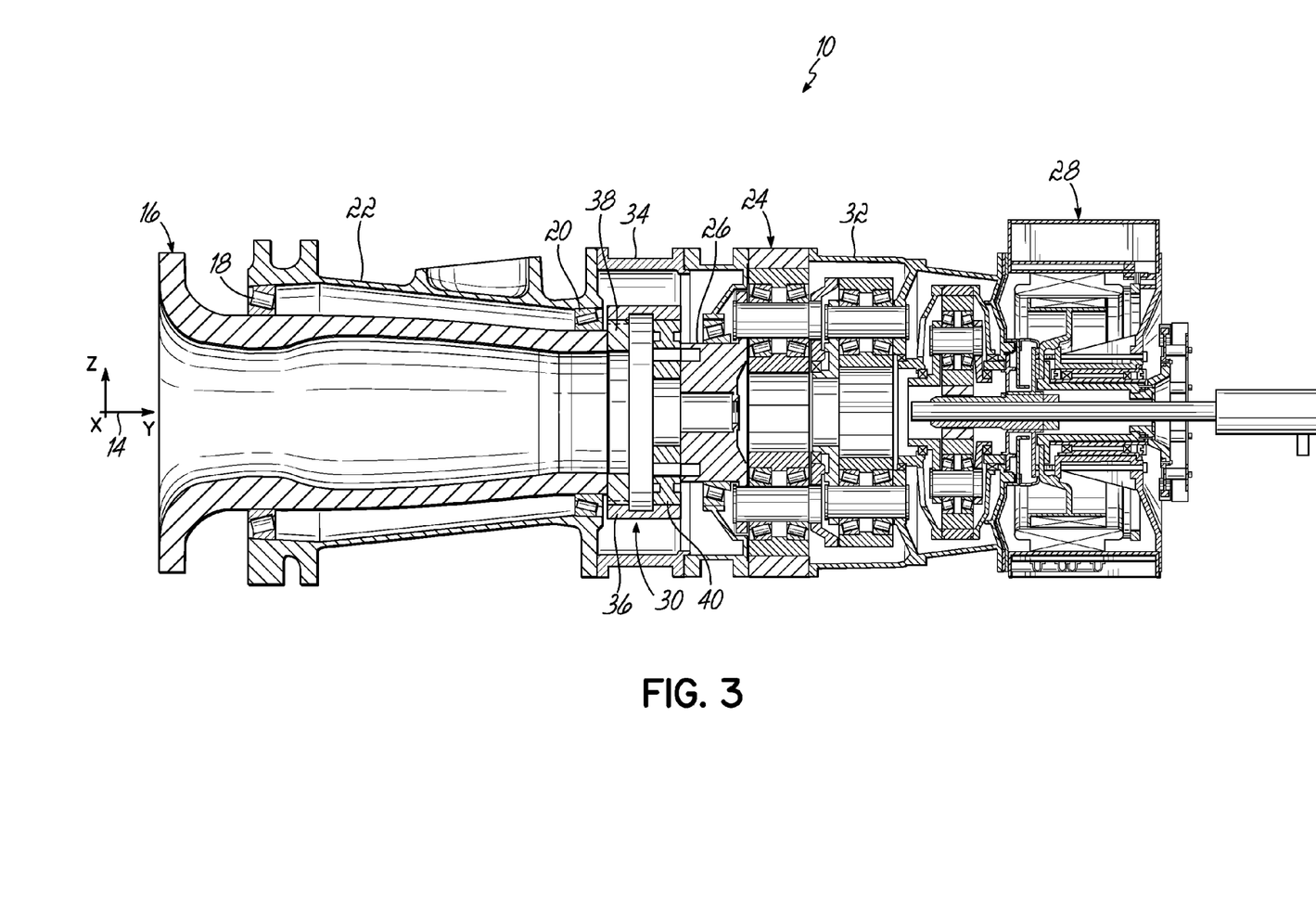
FIG. 3 is a cross-sectional view of the power transmission system of FIG. 2.

As shown in FIGS. 2 and 3, the power transmission system 10 includes a main shaft 16 coupled to the hub 6 (FIG. 1). The power transmission system 10 also includes first and second bearings 18, 20 supporting the main shaft 16, a bearing housing 22 surrounding the first and second bearings 18, 20, and a gearbox 24 having a gearbox input member 26 driven by the main shaft 16. The gearbox 24 increases the rotational speed of the main shaft 16 to drive a generator 28, as will be described in greater detail below.

In the particular embodiment shown, the gearbox 24 and generator 28 are suspended from the bearing housing 22 and main shaft 16; there is no support for the gearbox 24 or generator 28 themselves. More specifically, the gearbox 24 includes the gearbox input member 26, which is coupled to the main shaft 16 by a coupling 30, and a gearbox housing 32, which is suspended from the bearing housing 22 via a coupling housing 34. The coupling 30 is shown as a curved tooth gear coupling including a ring spline coupling element 36 that engages coupling flanges 38, 40 associated with the main shaft 16 and gearbox input member 26, respectively. This and other embodiments of the coupling 30, along with the overall kinematics of the power transmission system 10, are described in more detail in PCT Patent Application No. PCT/DK2011/050388 ("the '388 application"), entitled "WIND TURBINE POWER TRANSMISSION SYSTEM" and filed concurrently herewith, the disclosure of which is fully incorporated herein by reference. As described in the '388 application, particular kinematic relationships are provided that enable the power transmission system 10 to accomplish its primary function—the transfer of torque—in a reliable manner. The kinematic relationships also help the power transmission system 10 achieve its secondary function—the transfer of loads other than torque from a rotor to a tower—in an advantageous manner.

The type of gearbox input member 26 depends on the particular gearbox design. A planet carrier for a differential gearbox is shown, although details of the differential gearbox need not be discussed because other gearbox design suitable for wind turbines may be used instead. This includes, for example, conventional planetary gearboxes, compound planetary gearboxes, fixed carrier planetary gearboxes, etc., each involving single or multiple stages.

Similar considerations apply with respect to the generator 28. That is, the type and arrangement components within the generator 28 will depend on the particular generator design. Thus, although the design shown in the figures will be described below, the description is primarily intended to facilitate discussion of other aspects. The claimed invention relates more to the external components of the generator 28 and their use rather than the type and arrangement of internal components. Additional details and advantages relating to the internal components of the generator 28 are provided in PCT Patent Application No. PCT/DK2011/050389 ("the '389 application"), also entitled "WIND TURBINE POWER TRANSMISSION SYSTEM" and filed concurrently herewith, the disclosure of which is fully incorporated herein by reference. The gearbox 24 and generator 28 nevertheless represent what is considered a medium-speed power transmission system in the wind power industry (e.g., the generator 28 having an intended operating speed in the range of 10-500 rpm).

With this in mind, the generator 28 includes a rotor 100 and stator 102 positioned within a generator housing 104. The rotor 100 is driven by a gearbox output member 80 to rotate within the generator housing 104 and, as a result, effectively divides the generator housing 104 into a drive-end side ("DE side") and non-drive-end side ("NDE side"). On the DE side, the generator housing 104 is coupled to the gearbox housing 32 using fasteners (e.g., bolts; not shown) or other suitable techniques. A reinforced flange 106 (FIG. 4A) may be provided on the gearbox housing 32 for this purpose. An isolation member 108 may also be provided between the flange 106 and generator housing 104 to help prevent electrical currents from being transferred to the gearbox. Additionally, the generator 28 may further include a drive-end shield ("DE shield") 110 between the gearbox housing 32 and generator housing 104. The DE shield 110 is coupled to the generator housing 104 and covers the DE side to protect the internal components of the generator 28 during transport, but need not be provided if such protection is not necessary. The gearbox housing 32 may effectively cover the DE side of the generator housing 104 after integration of the gearbox 24 and generator 28 in such embodiments.

The stator 102 is supported by the generator housing 104 between the DE and NDE sides. The stator 102 is shown schematically in the figures, but in one embodiment the generator 28 may be a permanent-magnet generator with the stator 102 comprising a resin-impregnated assembly of steel laminations forming teeth on an iron core. The assembly may also include coils arranged in a distributed winding pattern between the teeth. When the rotor 100 rotates relative to the stator 102, permanent magnets on the rotor 102 induce a voltage in the windings. The windings are connected to a copper bus ring (not shown), which in turn is connected to power cables 112 (FIG. 2) for delivering the electrical output elsewhere. Again, this is merely one possible embodiment. Other embodiments will be appreciated by persons skilled in wind turbine generator design, including those not involving permanent magnets.

Figure 4:
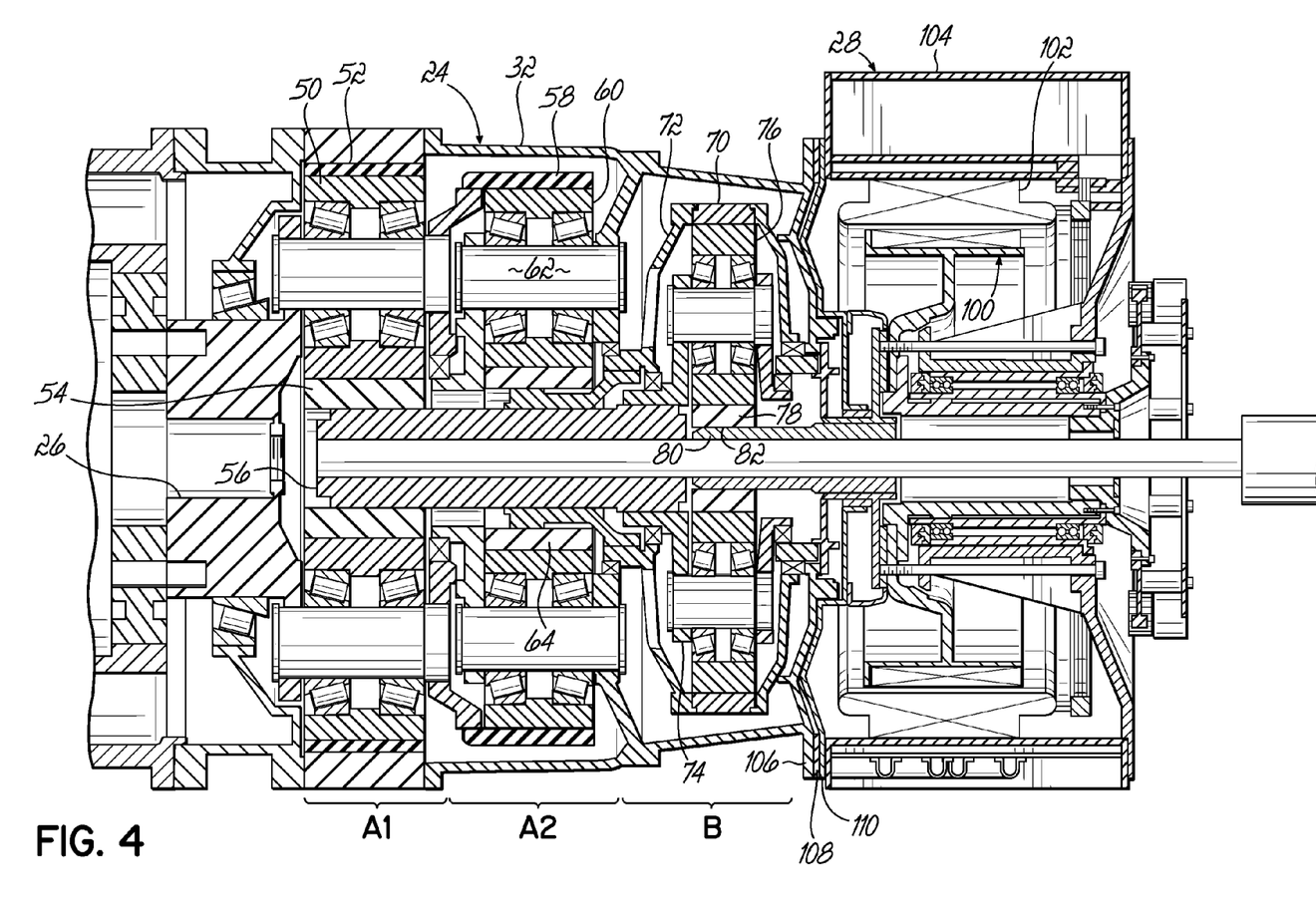
FIG. 4 is a cross-sectional view showing a gearbox and generator of the power transmission system of FIG. 2 in further detail.
Figure 4A:
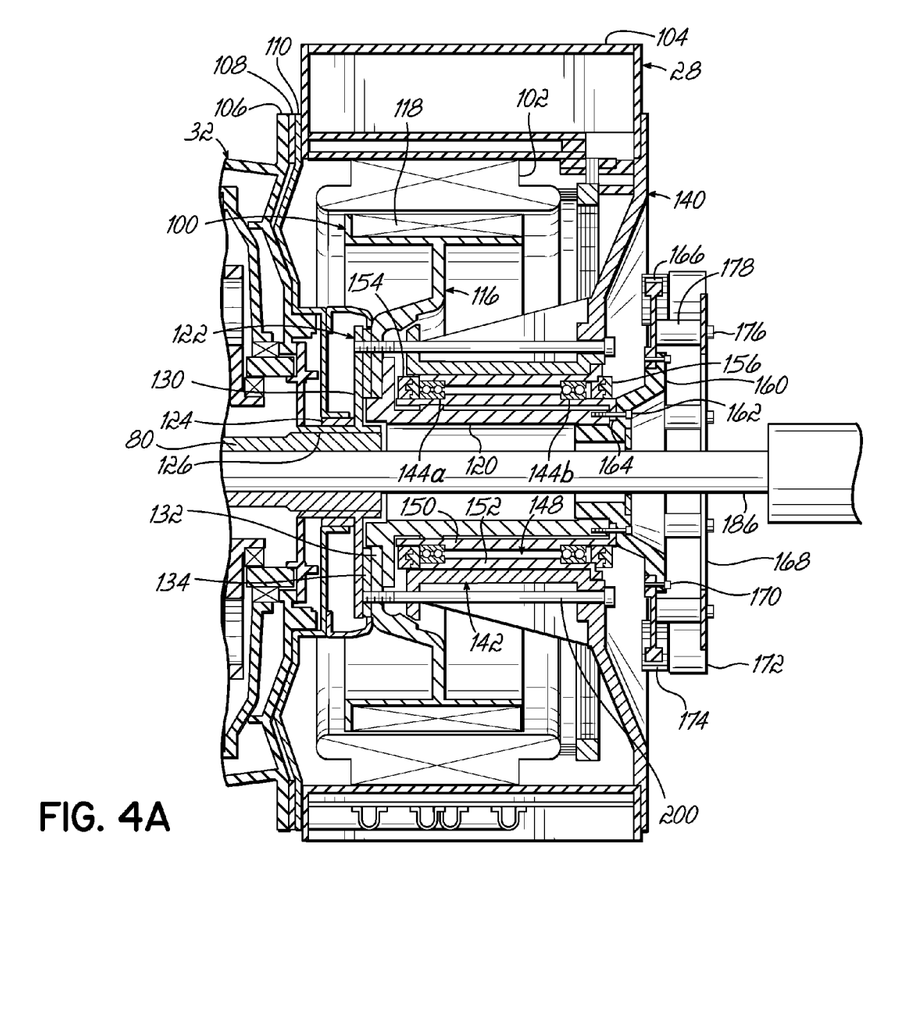
FIG. 4A is an enlarged cross-sectional view showing the generator of FIG. 4 in further detail.

The rotor 100 includes a rotor body 116 supporting the permanent magnets (or other flux-generating members, depending on the generator design). The permanent magnets may be, for example, held in core segments 118 secured to the rotor body 116. A rotor shaft ("drive hub") 120 is coupled to the rotor body 116 by being secured thereto (e.g., by fasteners) or integrally formed therewith. Thus, although in general a two-piece assembly for supporting the permanent magnets is shown, in alternative embodiments the rotor shaft 120 and rotor body 116 may be different portions of a unitary structure. At least a portion of the rotor shaft 120 extends in an axial direction.

The rotor shaft 120 is also coupled to the gearbox output member 80. In the embodiment shown, a floating shaft 122 is provided for this purpose. The floating shaft 122 extends from within the gearbox housing 32, through an opening in the DE shield 110, and into the generator housing 104. A labyrinth seal 124 may be provided between the DE shield 110 and exterior of the floating shaft 122 to allow relative rotation yet prevent gearbox lubricant from entering the generator housing 104. Static seals (not shown) may also be provided between the gearbox housing 32 and DE shield 110 to further assist fluid containment. The interior of the floating shaft 122, on the other hand, is coupled to the gearbox output member 80 by a spline coupling 126 so that the floating shaft 122 is driven by the gearbox output member 80. In this regard, the gearbox output member 80 in the embodiment shown functions as a quill shaft to transfer torque from the gearbox 24 to the generator 28 (via the floating shaft 122). The length of the floating shaft 122, which may extend into the rotor shaft 120, and axial location of the spline coupling 126 may be selected to help tune the torsional resonance of the power transmission system 10.

Within the generator housing 104, a radially-extending flange 130 on the floating shaft 122 confronts a radially-extending portion 132 of the rotor body 116 and/or rotor shaft 120. This allows the floating shaft 122 to be coupled to the rotor 100 using bolts, pins, face gearing, or other coupling elements/methods. Displacement elements 200 in the form of elongated bolts may partially or fully serve this coupling function. As an alternative or additional way of coupling the floating shaft 122 to the rotor 100, a terminal portion of the floating shaft 100 may extend into and engage the rotor shaft 120 via a spline coupling. An isolation member 134 may be provided between the flange 130 and the part of the rotor 100 to which it is coupled to help prevent electrical currents from being transferred to the gearbox 24. The isolation member 134 is shown as a ring in the illustrated embodiment.

Still referring to FIG. 4A, the generator 28 further includes a non-drive-end shield ("NDE shield") 140 coupled to the NDE side of the generator housing 104. A spindle 142 extends from the NDE shield 140 in a generally axial direction and, in the embodiment shown, surrounds the rotor shaft 120. The spindle 142 may be integrally formed with the remainder of the NDE shield 140 (as shown), or the spindle 142 may be a separate component secured to the NDE shield 140. At least one generator bearing 144 is positioned between the spindle 142 and the rotor shaft 120 for rotatably supporting the rotor 100. These bearings also support the gearbox output member 80. As described in the '389 application, such an arrangement facilitates manufacturing, installation, and service. One particular aspect relates to how the displacement elements 200 may be used to move the rotor 100 toward the NDE shield 140 and into a "parked" position on the spindle 142.

The generator 28 may further include an end adaptor 160 coupled to the rotor shaft 120 and extending out of the generator housing 104. In the embodiment shown, bolts 162 extend through the end adaptor 160 and a terminal flange 164 on an inner sleeve 150 of the bearing cartridge 148 before engaging the rotor shaft 120. Thus, the rotor shaft 120, inner sleeve 150, and end adaptor 160 rotate together. The end adaptor 160 extends away from the NDE shield 140 so as to be positioned outside of the generator housing 104.

Figures 5, 6:
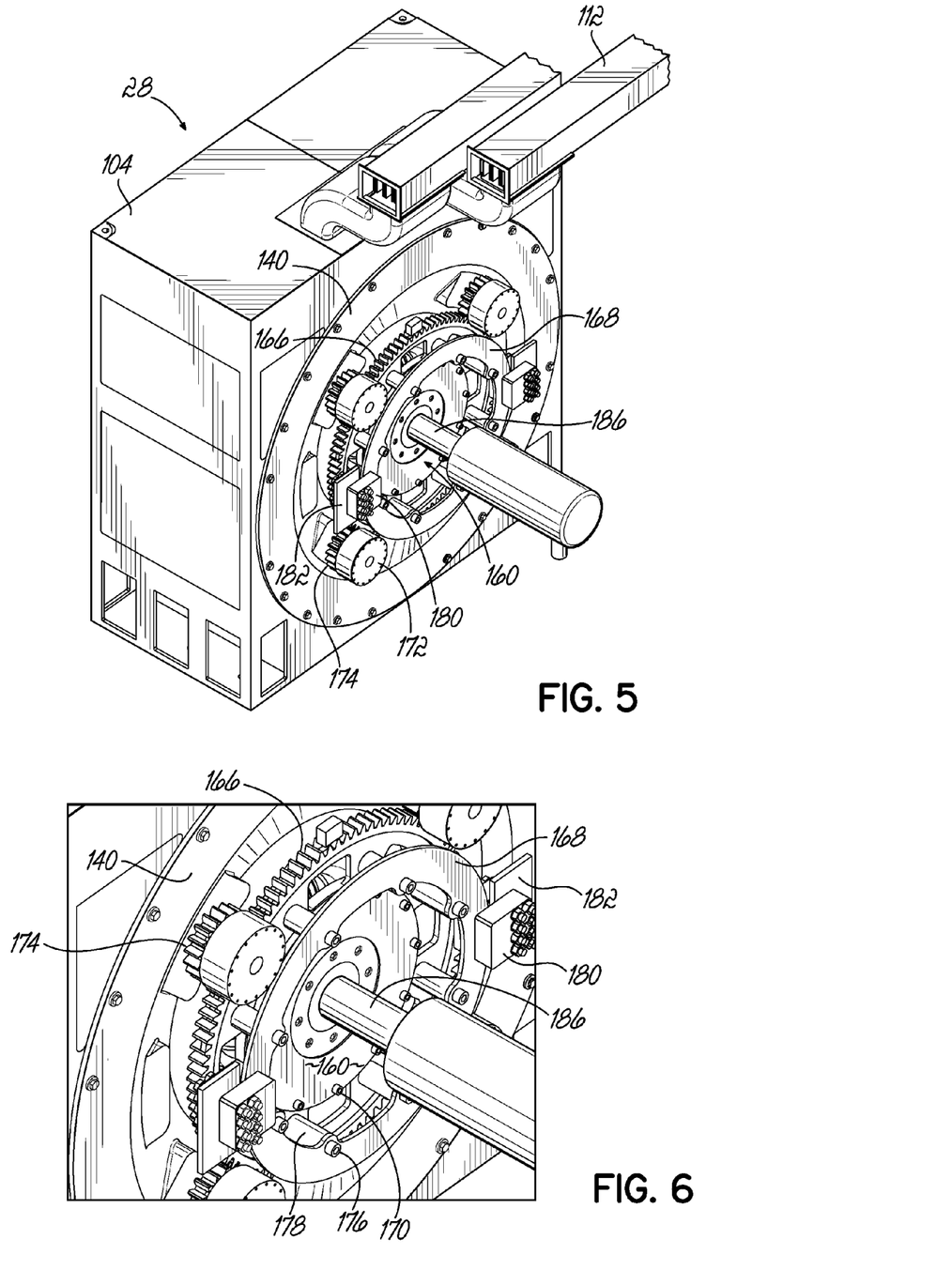
FIG. 5 is a rear perspective view of the generator in the power transmission system of FIG. 2.
FIG. 6 is an enlarged view of a portion of the generator shown in FIG. 5.

Now referring to FIGS. 4A, 5, and 6, the end adaptor 160 in the illustrated embodiment supports both a turning gear 166 and brake disc 168. The turning gear 166 is mounted to the end adaptor 160 by bolts 170, but may alternatively be an integral portion of the end adaptor 160. Either way, the turning gear 166 is coupled to the rotor shaft 120 via the end adaptor 160. One or more auxiliary drives 172 are mounted to the NDE shield 140 and positioned next to the turning gear 166. The auxiliary drives 172 are configured to rotate respective pinions 174 that mesh with the turning gear 166. Thus, the auxiliary drives 172 may be controlled to rotate the turning gear 166 when it is necessary to turn the driven components of the power transmission system 10 operatively coupled to the end adaptor 160 (e.g., the rotor shaft 120, gearbox output member 80, gearbox input member 26, main shaft 16, etc.). As will be described in greater detail below, some of the auxiliary drives 172 may be used only during operation while other may be used only during installation. The auxiliary drives 172 may comprise hydraulic motors in some embodiments.

The brake disc 168 is secured to the turning gear 166 by bolts 176 extending through spacers 178. Thus, the brake disc 168 is supported by the end adaptor 160 via the turning gear 166. In alternative embodiments, however, the brake disc 168 may be secured directly to the end adaptor 160. One or more brake calipers 180 are positioned about the brake disc 168 and configured to apply a friction braking force to the brake disc 168 during braking operations. The brake calipers 180 are supported by mounting brackets 182 secured to either the NDE shield 140 or a fixed structure in the nacelle, thereby fixing the brake calipers 180 relative to the brake disc 168. The structure for securing the mounting brackets 182 is not shown in the figures for sake of simplicity. Additionally, although not shown, the auxiliary drives 172, turning gear 166, and brake disc 168 may be housed within a removable cover secured to the NDE shield 140.

Finally, the power transmission system 10 further includes a pitch tube 186 extending through the gearbox 24 and generator 28. The pitch tube 186 accommodates hydraulic lines (not shown) and/or electrical cables routed through the main shaft 16 (FIG. 2) to the hub 6 for controlling the pitch system of the wind turbine 2. If desired, one or more bearings (not shown) may be provided between the pitch tube 186 and end adaptor 160 to support the pitch tube 186.

The above-described arrangement offers several advantages, several of which are due to the arrangement of the turning gear 166 and auxiliary drives 172. For example, the turning gear 166 is positioned outside of the generator housing 104 rather than on the gearbox 24 or between the gearbox 24 and generator 28. This allows the DE side of the generator housing 104 to be coupled to the gearbox housing 26 in a compact manner. Additional space for accommodating the turning gear 166 and auxiliary drives 172 is not required. In a medium-speed power transmission system like that described, such a consideration can be particularly important because a relatively large amount of torque may be required to rotate the turning gear 166 (compared to a power transmission system incorporating a gear stage with a high gear ratio). A larger auxiliary drive or increased number of auxiliary drives may be necessary.

Moreover, the gearbox 24 and generator 28 can remain integrated when service or removal of the turner gear 166 and/or auxiliary drives 172 is desired. Indeed, the NDE shield 140 may even remain coupled to the generator housing 104 during such service or removal. Removal may be desired because one or more of the auxiliary drives 172 may only be needed to help complete installation of the wind turbine or to help replace blades on the wind turbine. To this end, corresponding methods enabled by the above-described arrangement will be appreciated. This includes a method of installing a wind farm that includes a first wind turbine with the power transmission system 10.

According to the method, a tower of the first wind turbine is installed. The power transmission 10 is then installed on the tower, with auxiliary drives 172 being mounted to the NDE shield 140 before or after such a step. The method further includes mounting a hub to the power transmission system 10 and mounting one or more blades to the hub. It may be necessary or desirable to rotate the turning gear 166 to help bring the hub into orientations allowing the blades to be mounted. This is the case when the blades are mounted to the hub after installing the hub on the power transmission system 10.

To mount a first blade, for example, the hub is rotated to a suitable position for the blade to be lifted and aligned with a mounting location on the hub. After the first blade is mounted, the hub must be rotated to bring the mounting location for a second blade into a suitable orientation/position for alignment with the second blade (when the second blade is lifted and maneuvered with lifting equipment). Having less than a complete set of blades mounted on the hub creates an unbalanced load about the rotational axis; a significant amount of torque may be required for rotation. Advantageously, a plurality of the auxiliary drives 172 are provided for this purpose; four are shown in the illustrated embodiment. The auxiliary drives 172 provide the nominal torque to rotate the driven components of the power transmission system 10 and the hub with its unbalanced blade load.

When a complete set of blades (typically three) have been mounted to the hub, at least some of the auxiliary drives 172 may be removed from the NDE shield 140. Less torque is needed to rotate the hub at this point because the load about the rotational axis due to the weight of the blades is balanced. One of the auxiliary drives 172, for example, may be configured to provide the sufficient torque. This auxiliary drive may remain mounted to the NDE shield 140 to rotate the turning gear 166 when necessary to "index" the blades (i.e., help bring the hub to desired rotational positions) and/or slowly rotate the driven components of the power transmission system when the wind turbine is not operating to produce power.

The three auxiliary drives removed from the NDE shield 140 may be stored in conditions more favorable than those to which a wind turbine is exposed, particularly if the wind turbine is to be used in the offshore environment. The auxiliary drives may remain in storage until their use is once again necessary, such as during blade replacement, at which point they may be re-mounted to the NDE shield 140. Alternatively, the auxiliary drives removed from the power transmission system 10 may be used in the same manner to complete the installation of a second wind turbine. This process may be continued until complete sets of blades have been mounted to all wind turbines in the wind farm. Thus, the number of auxiliary drives needed to complete the installation of the wind farm may be minimized.

The embodiments described above are merely examples of the invention defined by the claims that appear below. Those skilled in the design of wind turbines will appreciate additional examples, modifications, and advantages based on the description. For example, although four auxiliary drives 172 are provided in the embodiment shown, alternative embodiments may include more or less auxiliary drives. These auxiliary drives may have different power outputs. Additionally, more than one auxiliary drive may remain mounted to the NDE shield 140 to carry out blade indexing. Again, these and other variations will be appreciated by skilled persons.

What is claimed:

1. A power transmission system for a wind turbine, comprising:
   a gearbox having a gearbox housing and a gearbox output member extending from the gearbox housing; and
   a generator integrated with the gearbox, the generator including:
      a generator housing coupled to the gearbox housing;
      a stator positioned within the generator housing;
      a rotor coupled to the gearbox output member so as to be driven thereby, the rotor being positioned within the generator housing and effectively dividing the generator housing into a drive-end side and non-drive-end side, the drive-end side being coupled to the gearbox housing, the stator being supported between the drive-end side and non-drive-end side;
      a non-drive-end shield coupled to the non-drive-end side of the generator housing and having a recess radially disposed about the rotor;
      an end adaptor coupled to the rotor and extending out of the generator housing so as to nest within the recess;
      at least one auxiliary drive mounted to the non-drive-end shield; and
      a turning gear positioned outside the generator housing next to the at least one auxiliary drive, the turning gear being coupled to the end adaptor so that at least a portion of the turning gear is received in the recess, the at least one auxiliary drive being configured to rotate a respective pinion that meshes with the turning gear.

2. The power transmission system according to claim 1, further comprising:
   a brake disc coupled to the end adaptor; and
   at least one brake caliper fixed relative to the brake disc and configured to apply friction thereto.

3. The power transmission system according to claim 1, where in the brake caliper is mounted to the non-drive-end shield.

4. The power transmission system according to claim 1, wherein the at least one auxiliary drive comprises a plurality of auxiliary drives configured to rotate the turning gear.

5. The power transmission system according to claim 4, wherein at least two of the auxiliary drives have different power outputs.

6. The power transmission system according to claim 1, wherein the at least one auxiliary drive comprises a hydraulic motor that drives the respective pinion.

7. A wind turbine, comprising:
   a power transmission system according to claim 1;
   a hub mounted to the power transmission system, the turning gear being operatively coupled to the hub; and
   a set of blades mounted to the hub.

8. A method of installing a wind farm, comprising:

installing a tower of a first wind turbine;

installing a power transmission system on the tower, the power transmission system including a gearbox and generator integrated together, the gearbox having a gearbox housing and a gearbox output member extending from the gearbox housing, the generator having a generator housing coupled to the gearbox housing, a stator positioned within the generator housing, a rotor coupled to the gearbox output member so as to be driven thereby, wherein the rotor is positioned within the generator housing and effectively divides the generator housing into a drive-end side and non-drive-end side, the drive-end side being coupled to the gearbox housing, and the stator being supported between the drive-end side and non-drive-end side, the generator further including a non-drive-end shield coupled to the non-drive-end side of the generator housing and having a recess radially disposed about the rotor, an end adaptor coupled to the rotor and extending out of the generator housing so as to nest within the recess, and a turning gear positioned outside the generator housing and coupled to the end adaptor so that at least a portion of the turning gear is received in the recess;

mounting at least one auxiliary drive to the non-drive-end shield, the turning gear being positioned next to the at least one auxiliary drive after the at least one auxiliary drive has been mounted;

mounting a hub to the power transmission system, the gearbox being configured to increase a rotational speed of the hub;

mounting one or more blades to the hub; and rotating the turning gear with the at least one auxiliary drive, wherein the at least one auxiliary drive rotates a respective pinion that meshes with the turning gear, and further wherein the hub is rotated by the turning gear.

9. The method according claim 8, wherein mounting the one or more blades comprises mounting less than a complete set of blades so as to create an unbalanced load on the hub, wherein mounting the at least one auxiliary drive comprises mounting a plurality of the auxiliary drives, and wherein rotating the turning gear comprises operating the plurality of auxiliary drives.

10. The method according to claim 9, further comprising:

mounting a complete set of blades to the hub;

removing at least some of the auxiliary drives from the non-drive-end shield; and thereafter, rotating the turning gear with one or more auxiliary drives remaining on the non-drive-end shield.

11. The method according to claim 10, wherein removing at least some of the auxiliary drives comprises removing all but one of the auxiliary drives.

12. The method according to claim 10, further comprising:

using one or more of the auxiliary drives removed from the non-drive-end shield of the first wind turbine to complete the installation of a second wind turbine.

* * * * *